(No Model.)
J. RIGBY.
METHOD OF SECURING TIRES TO WHEELS.
No. 362,111. Patented May 3, 1887.
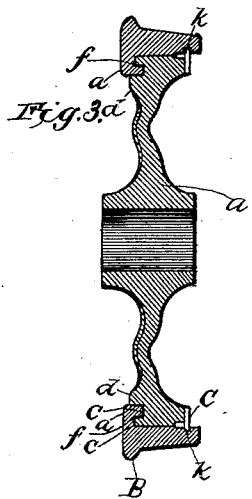
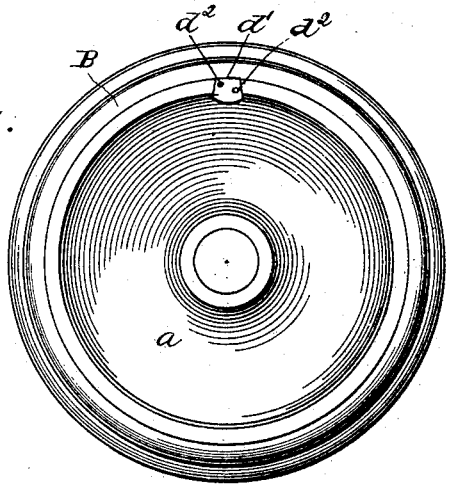
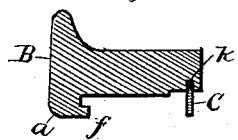
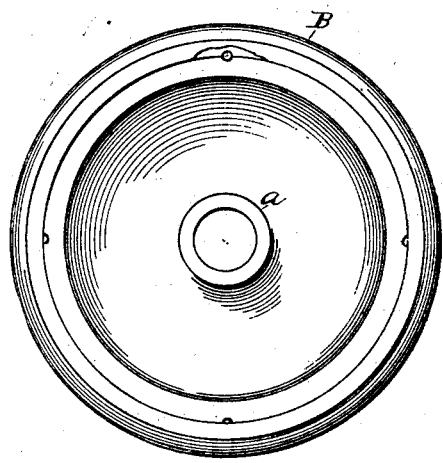
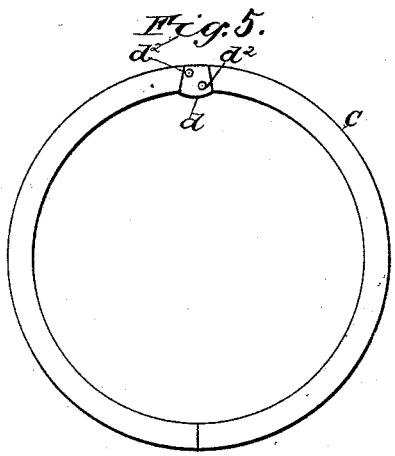
Witnesses;
Jos. A. Ryan
R. C. Laurie
James Rigby
Inventor.
By Chas. E. Barber
Atty.

UNITED STATES PATENT OFFICE.

JAMES RIGBY, OF MINNEAPOLIS, ASSIGNOR TO THE RIGBY CAR WHEEL COMPANY, OF ST. PAUL, MINNESOTA.

METHOD OF SECURING TIRES TO WHEELS.

SPECIFICATION forming part of Letters Patent No. 362,111, dated May 3, 1887.

Application filed March 3, 1886. Serial No. 193,885. (No model.)

*To all whom it may concern:*

Be it known that I, JAMES RIGBY, a citizen of the United States, residing at Minneapolis, in the county of Hennepin, in the State of Minnesota, have invented a new and useful Improvement in Methods of Securing together the Body or Web and the Tire of a Car-Wheel, of which the following is a description.

The object of my invention is to provide means of securing the sections of a car-wheel together in such a manner that they shall not be liable to work apart nor to rattle, and to construct a general and improved wheel which shall successfully withstand the pressure and strain incident to car-wheels used on heavy trains over rough tracks and heavy-graded road-beds; and to that end it consists in producing the wheels in sections which are imperforate throughout, and which are secured together without the use of bolts to hold the sections from being separated.

In the accompanying drawings, Figure 1 is a front view of my improved wheel. Fig. 2 is a rear view of the same with parts broken away to show dowel-pins which prevent the tire from turning on the web of the wheel. Fig. 3 is a vertical cross-section of my improved wheel, showing the means which I employ to secure the sections together. Fig. 4 is an enlarged detail view of the tire and of the locking devices which I employ to secure the tire to the body of the wheel. Fig. 5 is an enlarged detail view of a securing-ring which I employ to fasten the body of the wheel within the tire of the same.

Heretofore car-wheels have been made in sections. The body has been perforated to receive bolts which extend through both the body and the tire. Again, the body of the wheel has been formed in one piece, and has been secured in place within the tire by keys which extended into recesses in the tire, and which were held in place by riveting or bending a portion of the tire to lock the parts together.

In my invention all bolts are dispensed with in securing the parts together.

By reference to Fig. 3 it will be observed that I form the web of the wheel A in a single piece, provided near its outer periphery with a recess, beyond which is a projection or shoulder, $c$. It will also be observed that I form a recess or groove in the opposite end of the tire B, (shown at $k$.) The tire itself is provided with an inwardly-extending lug or projection, $a$, which is recessed at $f$ to receive the projection on the web of the wheel, above referred to. It will also be observed that there is a shoulder, $d$, between the outer periphery of the web and the hub, which abuts squarely against the inwardly-projecting flange $a$ on the tire. Thus it will be seen that the web of the wheel and the tire are practically dovetailed together in direct alignment with the flange of the car-wheel.

On the inside of the wheel I place the ring C, which is forced apart to fit within the annular groove in the tire, thus securely locking the tire and the body of the wheel. The ring C is made in sections, and is preferably of springy material, which is forced out or expanded to lock the sections together, and is held in this extended or expanded position by the wedge $d'$.

The manner of securing the sections together and of locking the same is practically as follows: Having formed the body of the wheel with suitable recesses and projections, and having formed the tire with corresponding recesses and projections, the body is forced in position within the tire. Then the ring C is sprung into the recess on the inside of the wheel, when it automatically expands and springs back in the bottom of the groove in the inner periphery of the tire. When it has been crowded back as far as possible with a hammer or other suitable device or devices, a wedge, $d'$, is forced in between the free or separated ends of the sectional ring C, and is clamped tightly in place, where it is held by suitable thumb-screws, while the ring is hammered and forced within the groove throughout. It is extended in the tire, and is carefully driven up at all points, while the thumb screw is tightened at intervals until the ring fits snugly within the bottom of the groove at every point. A little hole is then drilled through the lug-plate or wedge $d'$, either side of the thumb-screw, and a rivet is inserted and driven home, which securely locks the wedge in place.

It is obvious that other expanding and locking devices might be used in the place of this wedge $d'$ without departing from the spirit of my invention and without in any way interfering with its usefulness.

Having now described my improved method of securing sections together, what I desire to secure by Letters Patent, and what I therefore claim, is—

1. The herein-described method of securing together the body and tire of a car-wheel, which consists in placing the body of the wheel within a tire which is provided with an inwardly-projecting shoulder on its inner periphery and a groove at the opposite end, and securing the body and tire together by a ring which fits within the groove in the tire, substantially as described.

2. The herein-described method of securing together the body and tire of a car-wheel, which consists, essentially, in placing the body of the wheel within the tire, said tire having an inwardly-projecting shoulder on its inner periphery, and also having a groove within its inner periphery near the opposite end of the tire, and securing the body in place within the tire by an expansible ring and locking the ring rigidly in place, substantially as described.

3. The herein-described method of securing together the body and tire of a car-wheel, which consists in forming a flange on the inner portion of the tire and a groove nearer the opposite end of the tire, and placing the body of the wheel within the tire, between the inwardly-projecting flange and the groove, and securing it in place by an expansible ring, which is forced into the groove in the tire, and which is locked in position by a wedge or other suitable equivalent riveted or otherwise rigidly secured in place, substantially as described.

In testimony whereof I have hereunto set my hand in the presence of two subscribing witnesses.

JAMES RIGBY.

Witnesses:
N. D. ADAMS,
CHAS. E. BARBER.